March 20, 1945.　　　B. H. BROWALL　　　2,371,798
FLUID PRESSURE BRAKE
Filed Feb. 6, 1943　　　2 Sheets-Sheet 1

Inventor
B. H. BROWALL
By E. F. Wendroth
Attorney

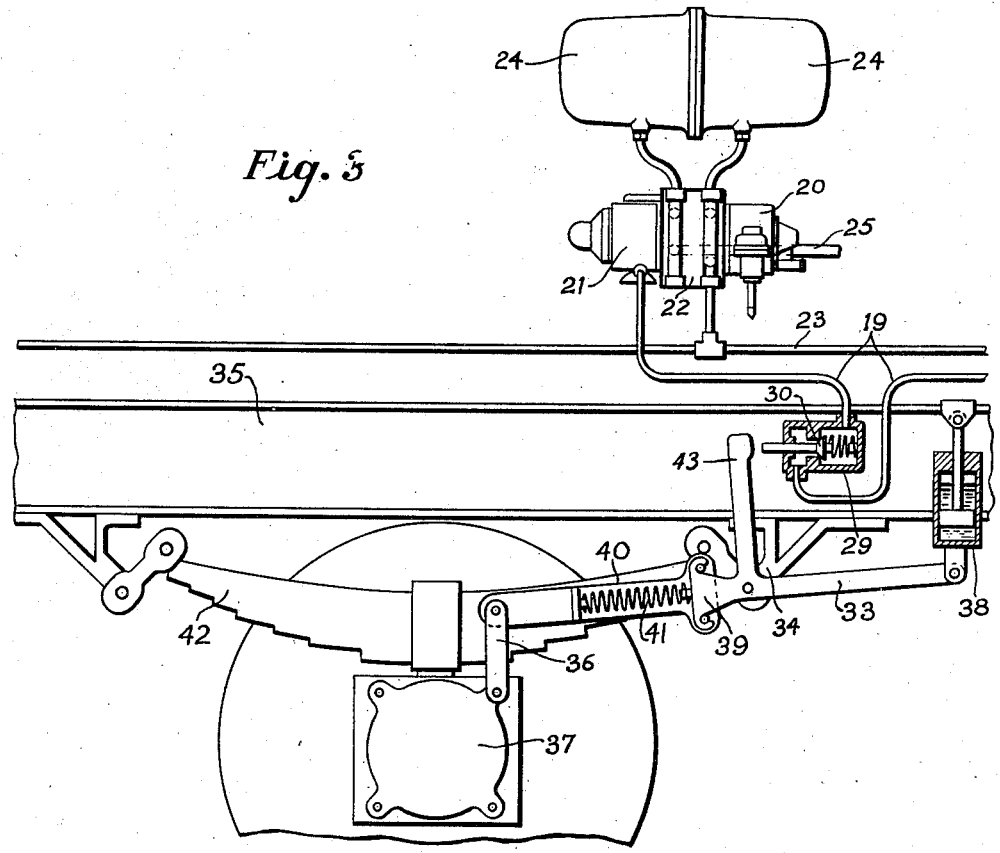
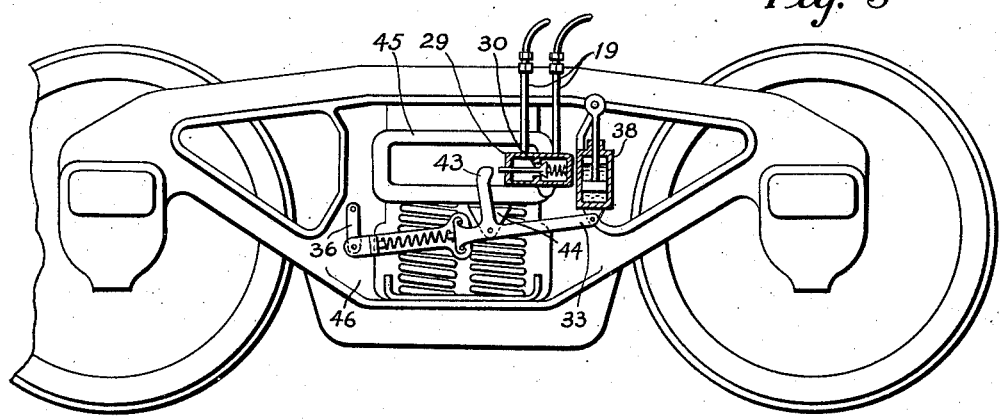

Patented Mar. 20, 1945

2,371,798

UNITED STATES PATENT OFFICE 2,371,798

FLUID PRESSURE BRAKE

Bert Henry Browall, Malmo, Sweden, assignor to Svenska Aktiebolaget Bromsregulator, Malmo, Sweden, a corporation of Sweden Application February 6, 1943, Serial No. 475,017
In Sweden November 27, 1940

10 Claims. (Cl. 188—195)

This application is a continuation-in-part of my U. S. patent application Serial No. 424,535 filed December 26, 1941.

This invention relates to fluid pressure brakes for vehicles, especially railway vehicles, and more particularly to brakes comprising a variable leverage brake rigging that can be set for one or the other of two different brake applying leverages by means of a leverage switching mechanism preferably in the form of a so called brake rod coupler which may be for instance of the type disclosed in U. S. Patent No. 2,081,660, issued to Axel Georg Hjalmar Carlbom, or No. 2,081,672, issued to Nils Gunnar August Malmquist, both on May 25, 1937.

One object of the invention is to provide means for performing the setting of the leverage switching mechanism or brake rod coupler automatically under the control of the load of the vehicle.

Another object of the invention is to combine the brake rod coupler with a pressure fluid operated servomotor for performing the setting of the variable leverage brake rigging for the lower or the higher brake applying leverage automatically under the control of the vehicle load.

For these and further objects, which will become apparent from the following description, the invention consists in the arrangement and in the combination, construction and organization of parts hereinafter described and illustrated by way of examples in the accompanying drawings and finally pointed out in the appendant claims.

In the drawings:

Fig. 3 is a somewhat diagrammatical view illustrating, partly in elevation and partly in section, one suitable form of an arrangement for supplying the servomotor shown in Fig. 2 with operating pressure fluid from the pressure fluid brake valve equipment and under the control of a valve device operable by means responsive to the load of the vehicle.

Fig. 5 is also a somewhat diagrammatical view illustrating, partly in elevation and partly in section, one suitable form of arrangement of the control valve device and the load responsive means for operating it at a railway bogie or truck.

Figure 1:
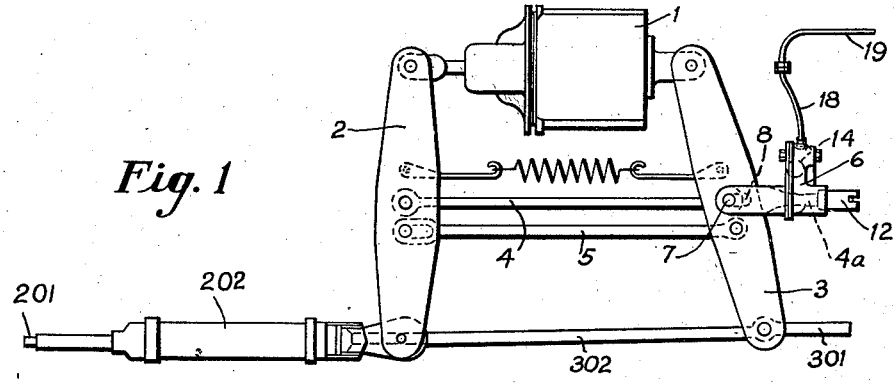
Fig. 1 is a fragmental plan view of a variable leverage brake rigging and illustrates, by way of example, a well known leverage switching mechanism or brake rod coupler for setting the brake rigging for one or the other of two different brake applying leverages.
Figure 2:
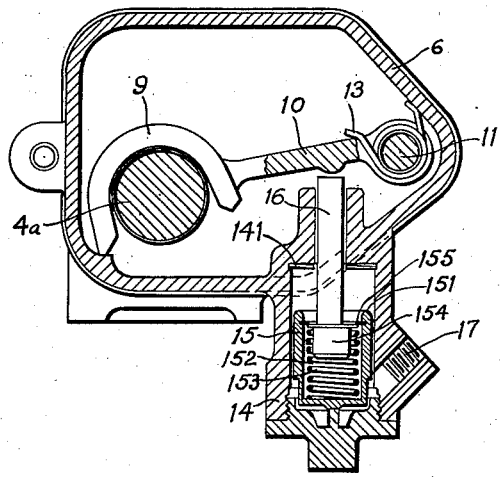
Fig. 2 is a cross section on a larger scale of the brake rod coupler shown in Fig. 1 and illustrates, by way of example, the combination of a pressure fluid operated servomotor with the brake rod coupler for setting the latter in one or the other of two positions for obtaining a lower or a higher brake applying leverage, respectively.

Referring first to Fig. 1, this shows a conventional brake rigging comprising a fluid pressure brake cylinder 1 and associated cylinder lever 2 and floating lever 3, which are connected to the brake levers at each end of the vehicle (not shown) by means of pull rods 201 and 301. One of these pull rods may suitably be provided with an automatic slack adjuster 202, for instance of the type described in my U. S. Patent No. 2,225,001, issued on December 17, 1940. Reference number 302 denotes the operating rod for such slack adjusted. Levers 2 and 3 are interconnected by means of two rods, the so called empty rod 4 and the so called load rod 5, which serve the purpose of supporting levers 2 and 3 in different points determining a lower and a higher brake applying leverage, respectively. The higher brake applying leverage is obtained by making the empty rod 4 inoperative, so that the braking operation is carried out through the load rod 5. The empty rod 4 is made operative or inoperative by means of a leverage switching mechanism or rod coupler comprising a housing 6 pivoted to the floating lever 3 by the bolt 7 connecting lever 3 to the empty rod 4. A long-hole 8 for the bolt 7 in the empty rod 4 provides for a certain amount of lost motion between the empty rod 4 and the floating lever 3. The empty rod 4 has an extension 4a extending beyond the bolt 7 and projecting slidably through the housing 6 and guiding the latter. As shown in Fig. 2 the housing 6 contains an abutment block 9 carried on an arm 10 pivoted on a shaft 11 parallel to the rod 4, so that the abutment block 9 can be moved to and from the rod extension 4a transversely thereto. The abutment block 9 is adapted for coaction with an abutment 12, Fig. 1, on the projecting end of the rod extension 4a. Preferably this abutment 12 is in the form of a nut adjustably screwed onto the projecting end of the rod extension 4a. When in the active position shown in Fig. 2 the abutment block 9 lies in the path of movement of the abutment nut 12 on the extension 4a of the rod 4 and thereby reduces the lost motion of the latter in relation to the lever 3. In this active position of the abutment block 9 the leverage switching mechanism or rod coupler is set for the lower brake applying leverage. For setting the leverage switching mechanism or rod coupler for the higher brake applying leverage the abutment block 9 is moved out of the said active position into an inactive positon in which it is out of the path of movement of the abutment 12.

As shown in Fig. 2 there is provided a pressure fluid operated servomotor for moving the abutment block 9 from the active position into the inactive position and for holding the abutment block in this last mentioned position against the action of a spring 13 or the like. The servomotor comprises a cylinder 14 preferably integral with the housing 6, and a piston 15 which is movable in the cylinder and provided with a piston rod 16 projecting into the housing 6 for direct actuation of the pivoted arm 10 carrying the abutment block 9. At the end opposite to the projecting piston rod 16 the cylinder 14 is provided with an inlet and outlet opening 17 for the operating pressure fluid. As shown in Fig. 1 this opening 17 is connected by means of a flexible pipe or hose 18 to a pipe conduit 19 which extends to a point of the pressure fluid brake valve equipment, which is immediately set under fluid pressure on application of the brake but from which the fluid pressure disappears when the brake is released. The flexible pipe or hose 18 is arranged to allow for movement of the servomotor cylinder 14 together with the housing 6 and the lever 3 in relation to the fixedly mounted pipe conduit 19.

The piston 15 carries on its upper end a circular edge 151 which, when operating pressure is admitted to the servomotor and the piston moves into its upper position, abuts a packing ring 141 mounted in the upper end of the servomotor cylinder 14. The purpose of this arrangement is to prevent leakage of operating pressure fluid. Provision is made to permit the edge 151 to abut the packing ring 141 even if for any reason the abutment block 9 should be prevented from moving when operating pressure is admitted to the servomotor. For this purpose there is provided in a cylindrical cavity 152 in the piston 15 a compressed spring 153 which keeps pressing a plunger 154 upwards against a stop ring 155 in the upper end of the cavity 152. The piston rod 16 rests loosely on this plunger 154. The tension of the spring 153 is sufficient to lift the abutment block 9 against the action of the spring 13 under ordinary circumstances, but should the abutment block 9 be prevented from moving, the force created by the operating pressure on the piston 15 will overcome the tension of the spring 153 and push the piston 15 upwards until the edge 151 abuts the packing ring 141, thus even in this case producing the desired sealing against leakage.

Figure 4:
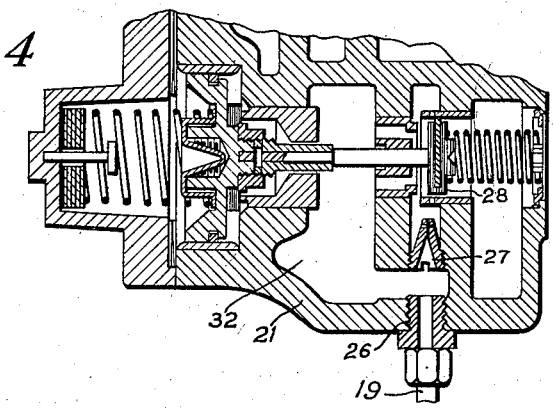
Fig. 4 is a detail section through a portion of the brake valve equipment shown in Fig. 3 and illustrates one form of connection of the pressure fluid supply conduit for the servomotor to the brake valve equipment.

Fig. 3 shows the well-known Westinghouse freight brake valve equipment type "AB" comprising the service and emergency portions 20 and 21, respectively, on each side of the pipe bracket portion 22 to which the brake pipe 23, the two compartment reservoir 24 and the brake cylinder (not shown in Fig. 3) are connected in the usual manner, the brake cylinder by the pipe 25. When the brake valve equipment is of this type the conduit 19 preferably may be connected to the insertion opening 26 (after removal of a plug normally closing that opening) for the so called delay choke plug 27 at the so called inshot valve 28 in the emergency portion 21 of the brake valve equipment, as shown in Fig. 4.

In the conduit 19 there is provided a control valve device which is shown in Fig. 3 and comprises a housing 29 for a spring pressed check valve 30 so arranged that it opens automatically to permit escape of any pressure fluid in the servomotor cylinder 14 (Fig. 2) through the conduit 19 when at release of the brake the space 32 (Fig. 4) inside the opening 26 in the emergency portion 21 of the brake valve is vented to the atmosphere and thereby relieved from the fluid pressure under which it is set immediately upon an application of the brake. As shown in Fig. 3 there is provided a vehicle load responsive operating device for positively lifting the check valve 30 from its seat in case the vehicle load exceeds a predetermined value, so that in such case the fluid pressure immediately building up in the space 32 (Fig. 4) at an application of the brake will be transmitted through the conduit 19 to the servomotor cylinder 14 and actuate the piston 15 therein for moving the abutment block 9 out of the active position shown in Fig. 2. In the form shown in Fig. 3 the load responsive operating device comprises a double-armed lever 33 pivoted on a supporting spring bracket 34 on the vehicle frame 35 and having one of its arms coupled by means of a link 36 to an axle box 37 of the vehicle, the other arm being connected to the vehicle frame by means of a dash-pot 38. The arm connected to the axle box is divided into two parts 39, 40 articulated in relation to each other in the plane of movement of the lever and in both directions against the action of a spring 41. The deflection of the supporting spring 42 of the vehicle under the load thereof imparts movement to the lever 33 which is provided with a projecting arm 43 for the actuation of the valve 30. The dash-pot 38, owing to the resilient articulation of the lever arm connected to the axle box, will prevent or smooth the transmission of rocking movements between the vehicle frame 35 and the axle box 37 to the valve actuating arm 43.

Fig. 5 shows a form of arrangement of the control valve device 29, 30 and the load responsive actuating device therefor at a railway bogie or truck. In this case the lever 33 is pivoted to a bracket 44 secured to the spring-supported bogie bolster 45 on which also the housing 29 of the control valve is secured, whereas the articulated arm of the lever 33 is connected by the link 36 to the bogie frame 46.

The advantages gained by the arrangement described for performing the setting of the brake applying leverage switching mechanism automatically under the control of the vehicle load are to be found in the simplicity of construction and in the reliability of function and further in that the arrangement requires a relatively small space and easily can be mounted in brakes already at hand with the smallest possible changes thereof. A further advantage special to the preferred form illustrated in Fig. 3, according to which the pressure fluid operated servomotor is directly combined with the housing of the leverage switching mechanism or brake rod coupler, resides in the possibility of constructing and mounting the rod coupler and the servomotor as a unit, and this also in such cases in which the leverage switching mechanism or rod coupler is mounted on a movable brake lever so as to partake in the movements thereof.

Obviously the invention is not limited to the forms herein described and shown on the drawings for the purpose of illustration, since many changes can be made without departing from the spirit of the invention and the scope of the appendant claims.

What I claim and desire to secure by Letters Patent is:

1. In a fluid pressure brake for vehicles, a variable leverage brake rigging including a brake lever, a rod for supporting said brake lever at a point determining a low brake applying leverage, means for supporting said lever at another point determining a high brake applying leverage, and a rod coupler comprising a housing pivoted to said brake lever at said first-mentioned point, and a member carried in said housing and movable therein into and out of an active position for setting said supporting rod into and out of operation, a pressure fluid operated servomotor comprising a cylinder carried on said housing and movable therewith, and a piston in said cylinder for actuating said movable member, a pressure fluid supply control valve device for said servomotor, and means responsive to the load of the vehicle for actuating said control valve device, said servomotor cylinder being integral with said housing.

2. In a fluid pressure brake for vehicles, a variable leverage brake rigging including a brake lever, a rod for supporting said brake lever at a point determining a low brake applying leverage, means for supporting said lever at another point determining a high brake applying leverage, and a rod coupler comprising a housing pivoted to said brake lever at said first-mentioned point, and a member carried in said housing and movable therein into and out of an active position for setting said supporting rod into and out of operation, a pressure fluid operated servomotor comprising a cylinder carried on said housing and movable therewith, and a piston in said cylinder for actuating said movable member, a pressure fluid supply control valve device for said servomotor, and means responsive to the load of the vehicle for actuating said control valve device, said servomotor piston being provided with a piston rod projecting into said housing for direct actuation of the movable member therein.

3. In a fluid pressure brake for vehicles, a variable leverage brake rigging including a brake lever, a rod for supporting said brake lever at a point determining a low brake applying leverage, means for supporting said lever at another point determining a high brake applying leverage, and a rod coupler comprising a housing pivoted to said brake lever at said first-mentioned point, and a member carried in said housing and movable therein into and out of an active position for setting said supporting rod into and out of operation, a pressure fluid operated servomotor comprising a cylinder carried on said housing and movable therewith, and a piston in said cylinder for actuating said movable member, a pressure fluid supply control valve device for said servomotor, and means responsive to the load of the vehicle for actuating said control valve device, said control valve device being connected in a fixedly mounted pressure fluid supply pipe conduit, and flexible hose means interconnecting the part of said last-named conduit that leaves the valve device and said servomotor cylinder, thereby to allow for movement of the latter together with the housing of the rod coupler and the brake lever carrying the same in relation to said pipe conduit.

4. In an empty and load brake equipment for a vehicle having a variable leverage brake rigging including a brake lever, a rod for supporting said brake lever at a point determining a lower brake applying leverage, means for supporting said lever at another point determining a higher brake applying leverage, and a rod coupler comprising a housing pivoted to said brake lever at said first-mentioned point, and a member carried in said housing and movable therein into and out of an active position for setting said supporting rod into and out of operation, a pressure fluid operated servomotor carried on said housing and movable therewith, said servomotor comprising a cylinder and a piston in said cylinder for actuating said movable member.

5. In an empty and load brake equipment for a vehicle having a variable leverage brake rigging including a brake lever, a rod for supporting said brake lever at a point determining a lower brake applying leverage, means for supporting said brake lever at another point determining a higher brake applying leverage, and a rod coupler comprising a housing pivoted to said brake lever at said first-mentioned point, a servomotor cylinder integral with said housing, and a pressure fluid operated piston in said cylinder for controlling said rod coupler.

6. In an empty and load brake equipment for a vehicle having a variable leverage brake rigging including a brake lever, a rod for supporting said brake lever at a point determining a lower brake applying leverage, means for supporting said brake lever at another point determining a higher brake applying leverage and a rod coupler comprising a housing pivoted to said brake lever at said first-mentioned point and a member carried in said housing and movable therein into and out of an active position for setting said supporting rod into and out of operation, a servomotor cylinder carried on said housing and movable therewith, a pressure fluid operated piston in said cylinder, and a piston rod projecting from said piston into said housing for direct actuation of said movable member therein.

7. In a fluid pressure brake for vehicles, a variable leverage brake rigging including a number of brake levers, a leverage switching mechanism associated with one of said brake levers and movable therewith, a pressure fluid operated servomotor carried on and movable with said leverage switching mechanism, said servomotor being adapted for controlling the said leverage switching mechanism, a pressure fluid supply control valve device for said servomotor, and a communication between said control valve device and said servomotor, said communication comprising a flexible tubing permitting movements of said servomotor relatively to said control valve device.

8. In an empty and load brake equipment for a vehicle having a variable leverage brake rigging, a fluid pressure system for operating the brake rigging, a constructional unit comprising a leverage switching mechanism forming part of the variable leverage brake rigging and comprising means movable into two different positions for conditioning the brake rigging for two different brake applying leverages, and a housing carrying and encasing said movable means, and a fluid pressure operated servomotor for actuating said movable means, said servomotor comprising a cylinder carried on said housing, and a piston in said cylinder, valve means for controlling said servomotor, and means acting in response to the load of the vehicle for controlling said valve means.

9. In an empty and load brake equipment for a vehicle having a variable leverage brake rigging, a fluid pressure system for operating the brake rigging, a constructional unit comprising a leverage switching mechanism forming part of the variable leverage brake rigging and comprising means movable into two different positions for conditioning the brake rigging for two different brake applying leverages, and a housing carrying and encasing said movable means, and a fluid pressure operated servomotor for actuating said movable means, said servomotor comprising a cylinder rigidly united with said housing, and a piston in said cylinder, valve means for controlling said servomotor, and means acting in response to the load of the vehicle for controlling said valve means.

10. In an empty and load brake equipment for a vehicle having a variable leverage brake rigging including a number of brake levers, a fluid pressure system for operating the brake rigging, a constructional unit comprising a leverage switching mechanism forming part of the brake rigging and comprising a housing pivoted to one of the brake levers, and a member encased in said housing and movable into two different positions for conditioning the brake rigging for two different brake applying leverages, and a fluid operated servomotor for actuating said movable member, said servomotor comprising a cylinder carried by, and movable with, said pivoted housing, and a piston in said cylinder, valve means for controlling said servomotor, and means acting in response to the load of the vehicle for controlling said valve means.

BERT HENRY BROWALL.